H. H. HIRSCH.
ELECTRIC BATTERY.
APPLICATION FILED MAY 12, 1911.
1,183,009.
Patented May 16, 1916.
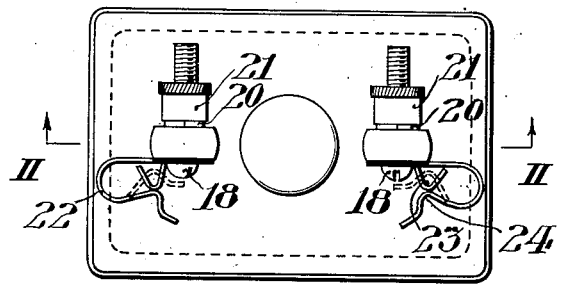
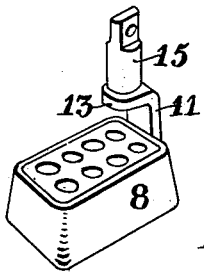
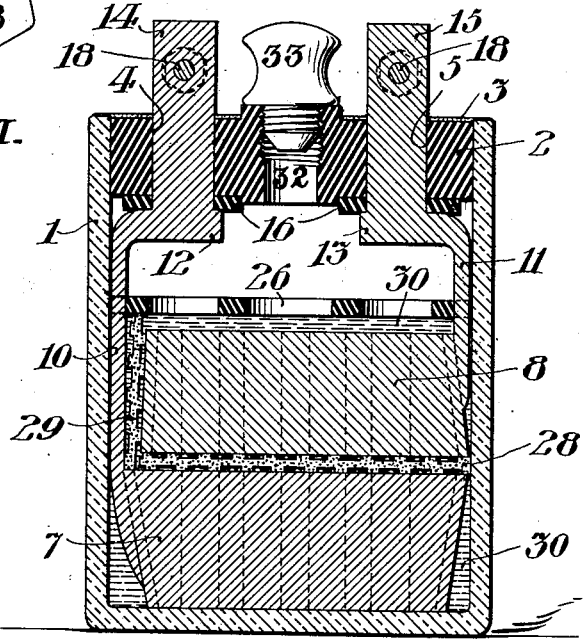
WITNESSES:
Philip W Vessey
James McCabe
INVENTOR:
Hiram H. Hirsch
by Arthur E. Paige
Attorney

UNITED STATES PATENT OFFICE.

HIRAM H. HIRSCH, OF PHILADELPHIA, PENNSYLVANIA.

ELECTRIC BATTERY.

1,183,009. Specification of Letters Patent. Patented May 16, 1916.

Application filed May 12, 1911. Serial No. 626,736.

*To all whom it may concern:*

Be it known that I, HIRAM H. HIRSCH, of Philadelphia, in the State of Pennsylvania, have invented a certain new and useful Improvement in Electric Batteries, whereof the following is a specification, reference being had to the accompanying drawing.

My invention is particularly applicable to a portable storage battery designed to be used in connection with a miner's lamp, but may be advantageously utilized in any battery which is subjected to such movement as would tend to spill or otherwise abnormally displace the electrolyte; my invention including a gelatinous electrolyte which is coherent to such a degree as to permit the battery to be inverted without disturbing the coöperative relation of the electrolyte with respect to the electrodes.

My invention includes the various novel features of construction and arrangement hereinafter more definitely specified.

In the drawings:—Figure I is a plan view of a battery conveniently embodying my improvement. Fig. II is a vertical sectional view of said battery taken on the line II, II, in Fig. I. Fig. III is a perspective view of the upper electrode shown in Fig. II.

In said figures; the cell 1, of insulating material, for instance glass or hard rubber or other molded material, is provided with the cover 2 which fits in it as indicated and is preferably made of hard rubber or suitable molded insulating compound having an electrolyte inlet 32 opening therethrough, screw threaded to engage the screw plug 33 by which it is normally closed. The joint between said cell 1 and cover 2 is preferably sealed by a plastic medium 3, and, said cover is provided with two electrode terminal outlets 4 and 5 extending vertically therethrough. The electrodes 7 and 8 are conveniently plane, perforated lead castings opposed in horizontally parallel position in said cell 1 having respective terminals 10 and 11 at respectively opposite ends thereof including overhanging flanges 12 and 13 and vertical standards 14 and 15, the latter extending through the respective electrode terminal outlets 4 and 5 in said cover 2. The washers 16 of resilient insulating material, preferably soft rubber, are interposed between said cover and said terminal flanges, surrounding the respective terminal standards 14 and 15. Conductor engaging means carried by said terminal standards 14 and 15 conveniently include bolts 18 extending through said standards, nuts 20 and 21 on said bolts, and spring clips 22 held in contact with said standards by said bolts. It is to be understood that said clips may be flexed as indicated in Fig. I so as to bring their bights 23 and 24 in registry to receive and resiliently engage the end of a wire conductor between them. The foraminous diaphragm 26 which is conveniently formed of insulating material like the cover 2 is fitted in said cell 1 between said overhanging terminal flanges 12 and 13 and the upper electrode 8, in spaced relation with the latter. Said diaphragm is perforated so that the electrolyte may gravitate therethrough when in liquid form but is retained, by said diaphragm, in operative relation with the electrodes 7 and 8 when congealed, so that when congealed the electrolyte cannot be accidentally displaced by the inversion and rough vibration to which the battery is necessarily subjected by the specific use for which it is designed. A corrugated porous insulating element 28, conveniently formed of wood, extends horizontally between said electrodes 7 and 8, and, a similar insulating element 29 extends between said upper electrode 8 and the terminal 10 of the lower electrode 7. Accidental contact of said electrodes with each other is prevented by said insulating elements 28 and 29 and the latter also serves to prevent the downward movement of said diaphragm 26 and maintain the latter in spaced relation with the upper electrode 8. Said insulating elements 28 and 29 permit access of the electrolyte to all sides of said electrodes 7 and 8 which, in a storage battery, are perforated grids filled with suitable active material which is also perforated as shown in dotted lines in Fig. II. The electrolyte 30 is colloid, coherent and of such consistency that at atmospheric temperatures it may be inverted without disturbing its coöperative relation with the electrodes.

I have found it convenient to produce an electrolyte having the characteristics herein contemplated, by mixing ninety-two per cent. of sodium silicate with eight per cent. of potassium silicate, forming a mixture having a specific gravity of 1.60; then diluting said mixture with water until it has a specific gravity of 1.18. I mix sulfuric acid of the specific gravity of 1.84 with sufficient water to reduce it to a specific gravity of 1.30 and adding to the mixture about one half gram of ammonium sulfate to each pound of the sulfuric acid. Equal parts of the two aqueous solutions aforesaid are mixed to form the electrolyte. The mixture of said two aqueous solutions may be immediately poured into the cell to the position shown in Fig. II and thereupon coagulates to the desired consistency to render it coherent to the degree contemplated.

Although I find it convenient to produce an electrolyte as herein described, it is to be understood that any suitable electrolyte having the desired degree of coherence may be employed. Therefore, I do not desire to limit myself to the precise details of construction and arrangement herein set forth, as it is obvious that various modifications may be made therein without departing from the essential features of my invention as defined in the appended claims.

I claim:—

1. In a battery, the combination with a cell; of electrodes in said cell, capable of congelation at a temperature above the freezing point of water; a congealable electrolyte in said cell in operative relation with said electrodes; and, a rigid plane foraminous diaphragm in said cell, bearing upon the top of said electrolyte whereby said electrolyte is retained in operative relation with said electrodes, when congealed, but is permitted to pass through said diaphragm when liquefied.

2. In an electric storage battery, the combination with a cell of insulating material; of a cover for said cell, capable of congelation at a temperature above the freezing point of water, electrodes in said cell extending parallel with said cover; a congealable electrolyte in said cell in operative relation with said electrodes; and, a diaphragm in said cell, extending parallel with said cover and electrodes, in contact with said electrolyte whereby said electrolyte is retained in operative relation with said electrodes, when congealed, but is permitted to pass said diaphragm when liquefied.

3. In an electric battery, the combination with a cell of insulating material; of a cover for said cell, having two electrode terminal outlets; two electrodes opposed in horizontally parallel position in said cell, having terminals at respectively opposite ends thereof including vertical standards extending through the respective electrode terminal outlets in said cover; a congealable electrolyte, capable of congelation at a temperature above the freezing point of water; and a foraminous diaphragm fitted in said cell between said cover and the upper one of said electrodes in spaced relation with the latter, whereby said electrolyte is retained in operative relation with said electrodes, when congealed, but is permitted to pass through said diaphragm when liquefied.

4. In a battery, the combination with a cell; of electrodes in said cell extending horizontally; a congealable electrolyte in said cell, capable of congelation at a temperature above the freezing point of water, in operative relation with said electrodes; and a foraminous diaphragm, permeable by liquid at atmospheric pressure, extending horizontally in said cell, bearing upon the top of said electrolyte, whereby said electrolyte is retained in operative relation with said electrodes, when congealed, but is permitted to pass through said diaphragm when liquefied.

5. In a battery, the combination with a cell; of electrodes in said cell extending horizontally; a congealable electrolyte in said cell, capable of congelation at a temperature above the freezing point of water, in operative relation with said electrodes; and a foraminous diaphragm, permeable by liquid at atmospheric pressure, extending horizontaly in said cell; forming a compartment in said cell inclosing said electrolyte with said electrodes; whereby said electrolyte is retained in operative relation with said electrodes, when congealed, but is permitted to pass through said diaphragm when liquefied.

6. In an electric battery, the combination with a cell; of two electrodes opposed in horizontally parallel position in said cell, one above the other, and having openings extending vertically through them in axial alinement; a congealed electrolyte extending from one electrode to the other through said openings; and a diaphragm, extending horizontally in said cell, above the upper electrode, constructed and arranged to prevent the escape of said electrolyte from operative relation with said electrodes; said diaphragm having an opening through which said electrolyte may pass, at atmospheric pressure, when liquefied; whereby said electrolyte may be inserted and removed, when liquefied, without removal of said diaphragm.

In testimony whereof, I have hereunto signed my name at Philadelphia, Pennsylvania, this eighth day of May, 1911.

HIRAM H. HIRSCH.

Witnesses:
HARRY SCHWARTZ,
ARNOLD KATZ.